(12) United States Patent
Egedal et al.

(10) Patent No.: US 8,039,981 B2
(45) Date of Patent: Oct. 18, 2011

(54) MONITORING OF BLADE FREQUENCIES OF A WIND TURBINE

(75) Inventors: Per Egedal, Herning (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 81 days.

(21) Appl. No.: 12/672,532

(22) PCT Filed: Aug. 7, 2008

(86) PCT No.: PCT/EP2008/060385
§ 371 (c)(1),
(2), (4) Date: Feb. 8, 2010

(87) PCT Pub. No.: WO2009/021900
PCT Pub. Date: Feb. 19, 2009

(65) Prior Publication Data
US 2011/0148110 A1    Jun. 23, 2011

(30) Foreign Application Priority Data
Aug. 13, 2007 (DK) .................. 2007 01144

(51) Int. Cl.
*F03D 9/00* (2006.01)
*H02P 9/04* (2006.01)
*F03B 13/00* (2006.01)
*F03B 13/10* (2006.01)
(52) U.S. Cl. .............. 290/44; 290/43; 290/54; 290/55
(58) Field of Classification Search .............. 290/43, 290/44, 54, 55
See application file for complete search history.

(56) References Cited

U.S. PATENT DOCUMENTS

| 4,379,678 | A | * | 4/1983 | Carlock et al. | 416/98 |
|---|---|---|---|---|---|
| 6,940,186 | B2 | * | 9/2005 | Weitkamp | 290/44 |
| 7,160,083 | B2 | * | 1/2007 | Pierce et al. | 416/61 |
| 7,322,794 | B2 | * | 1/2008 | LeMieux et al. | 416/40 |
| 7,550,862 | B2 | * | 6/2009 | Altemark | 290/44 |
| 7,822,560 | B2 | * | 10/2010 | LeMieux | 702/34 |
| 2004/0151577 | A1 | * | 8/2004 | Pierce et al. | 415/4.1 |
| 2006/0070435 | A1 | * | 4/2006 | LeMieux et al. | 73/168 |
| 2006/0140761 | A1 | * | 6/2006 | LeMieux | 416/61 |
| 2008/0111379 | A1 | * | 5/2008 | Altemark | 290/44 |
| 2009/0047130 | A1 | * | 2/2009 | Egedal | 416/61 |
| 2009/0129924 | A1 | * | 5/2009 | Rebsdorf et al. | 416/43 |
| 2009/0232635 | A1 | * | 9/2009 | Menke | 415/17 |
| 2010/0003134 | A1 | * | 1/2010 | Edwards et al. | 416/1 |

(Continued)

FOREIGN PATENT DOCUMENTS

| EP | 1643122 A2 | 4/2006 |
|---|---|---|
| WO | WO 9957435 A1 | 11/1999 |

*Primary Examiner* — Pedro J Cuevas (57) ABSTRACT

A method for monitoring blade frequencies of a wind turbine and a monitoring system are provided. An accelerometer is attached to a rotating hub of a wind turbine measuring vibrations of the hub. To extract vibration signals originating from each blade, the vibration signals are combined with measuring signals from the azimuth angle sensor. Alternatively, the azimuth angle is found by using the measured accelerations in two directions representing the centrifugal forces and vibrating forces of the hub and feeding these signals into a phase locked loop unit establishing a phase of the rotating hub representing the azimuth angle. To extract each blade frequency, a Fast Fourier Transformation is used on the signals from the accelerometer. To monitor a severe change in each blade frequency, each blade frequency is compared to other blade frequencies and an alarm is set when a given level is reached and the wind turbine is stopped.

20 Claims, 8 Drawing Sheets

U.S. PATENT DOCUMENTS

| | | | |
|---|---|---|---|
| 2010/0025996 A1* | 2/2010 | Edwards et al. | 290/44 |
| 2010/0140936 A1* | 6/2010 | Benito et al. | 290/44 |
| 2010/0181769 A1* | 7/2010 | Altemark et al. | 290/44 |
| 2010/0209243 A1* | 8/2010 | Birkemose et al. | 416/1 |
| 2010/0250013 A1* | 9/2010 | Birkemose et al. | 700/287 |
| 2011/0133458 A1* | 6/2011 | Harrison et al. | 290/44 |

* cited by examiner

FIG 1  PRIOR ART edge-wise vibration flap-wise vibration

MONITORING OF BLADE FREQUENCIES OF A WIND TURBINE

CROSS REFERENCE TO RELATED APPLICATIONS

This application is the US National Stage of International Application No. PCT/EP2008/060385 filed Aug. 7, 2008, and claims the benefit thereof. The International Application claims the benefits of Danish Application No. 200701144 DK filed Aug. 13, 2007. All of the applications are incorporated by reference herein in their entirety.

FIELD OF THE INVENTION

The present invention relates to a method for monitoring blade frequencies of a wind turbine and a monitoring system for performing the method.

BACKGROUND OF THE INVENTION

Figure 1:
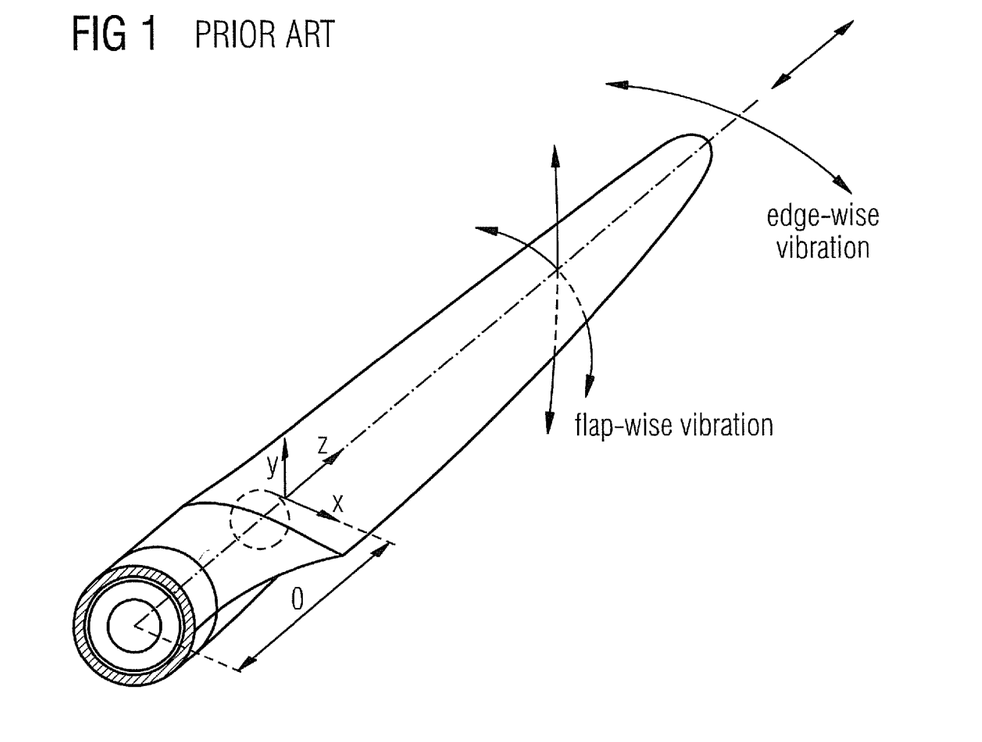
FIG. 1 shows a wind turbine according to prior art.

It is known to monitor blade frequencies of a wind turbine to monitor if the frequencies of each blade are changing due to e.g. material faults in the blades, lightning strikes or other influences. The monitoring is usually done by placing one or more fast responsive sensors like accelerometers, in each blade of a wind turbine as described in WO 99/57435 A1 and shown on FIG. 1. This is an expensive solution because of the need of many expensive sensors.

On existing wind turbines which do not have the mentioned sensors built into the blades to monitor the blade frequencies, it is very difficult and expensive to build in the sensors afterwards as they have to be placed in each blade.

SUMMARY OF THE INVENTION

It is thus an object of the present invention to provide a method for monitoring blade frequencies of a wind turbine and a monitoring system for performing the method which is both easier to build into existing wind turbines and less expensive.

This object is solved by a method for monitoring blade frequencies of a wind turbine and by a monitoring system as claimed in the independent claims. The depending claims contain further developments of the invention.

By the invention an accelerometer is attached in the center of the rotating hub of a wind turbine and thereby measuring the vibrations of the hub. To extract the vibration signals originating from each blade, the vibration signals are modulated by combining them with the measuring signals from the azimuth angle sensor (rotating angle), which is normally used for pitch control. To further extract each blade frequency a Fast Fourier Transformation (FFT) or a phase locked loop (PLL) unit is used on the modulated signals from the accelerometer.

Modulating the vibration signals may be done with a function taking into account the rotating hub or blade angle azimuth, and may, in particular, be based on the cosine of the rotating hub or blade angle azimuth or the sum of the cosine of the hub or blade angle azimuth and a constant number.

To further monitor a severe and alarming change in each blade frequency each blade frequency is compared to the other blade frequencies and an alarm is set if a given level is reached.

By the invention the azimuth angle is alternatively found by using the measured accelerations in two directions representing the centrifugal forces and vibrative forces of the hub and feeding these signals into a phase locked loop (PLL) unit which establishes a phase of the rotating hub representing the rotating azimuth angle. Thereby there is no need for the above mentioned azimuth angle sensor and the monitoring system is integrated into one unit.

BRIEF DESCRIPTIONS OF THE DRAWINGS

The invention will now be described in further details with reference to the accompanying drawings in which.

DETAILED DESCRIPTION

Figure 2:
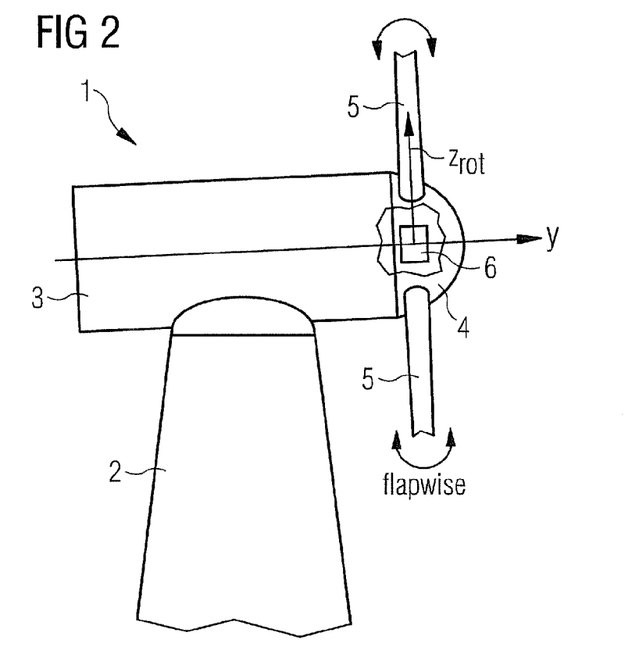
FIG. 2 shows a wind turbine according to the invention in a side view.
Figure 3:
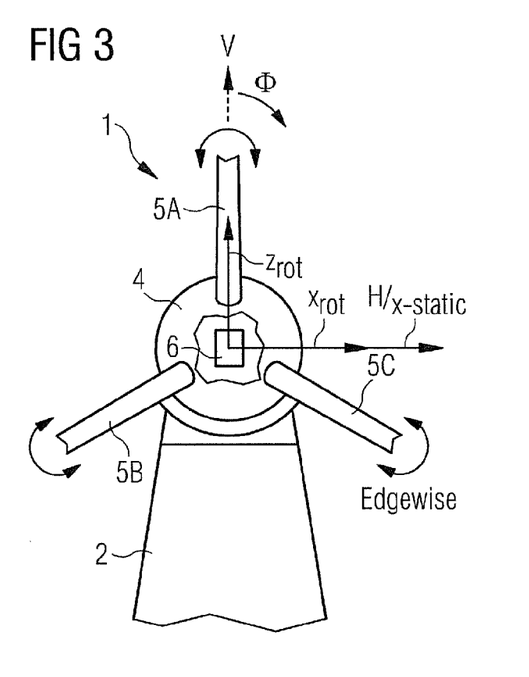
FIG. 3 shows a wind turbine according to the invention in a front view.

The monitoring system is build into a wind turbine 1 as shown on FIGS. 2 and 3 comprising a tower 2, a nacelle 3, a hub 4 and one or more rotating blades 5. The monitoring system consists of an accelerometer 6 with a built-in controller or calculator (not shown) attached to the center of the hub 4 for sensing vibrations of the hub 4 originating from the vibrations of each rotating blade 5. The accelerometer senses the vibrations in three directions, transverse the hub ($x_{rot}$-direction and $z_{rot}$-direction perpendicular to each other) and along the hub (y-direction) and rotates with the hub and the blades. As the accelerometer 6 with the built-in controller or calculator is attached to the hub 4 in extension of the nacelle 3 on top of the tower 2, it is obvious that the accelerometer senses the frequencies of all the blades through the vibrations of the tower 2.

Alternatively if the measurement of vibration in the y-direction along the hub 4 is not needed, the accelerometer 6 is then only sensing the vibrations in the above mentioned other two directions. This allows for a more simple and cheaper 2-way accelerometer 6.

To extract each blade frequency the rotating angle (azimuth angle) Φ of the rotating blades is used by the monitoring system. The rotating azimuth angle Φ can be sensed by using a sensor (not shown) which is normally used for the pitch control, which is a common control system of a wind turbine.

Figure 9:
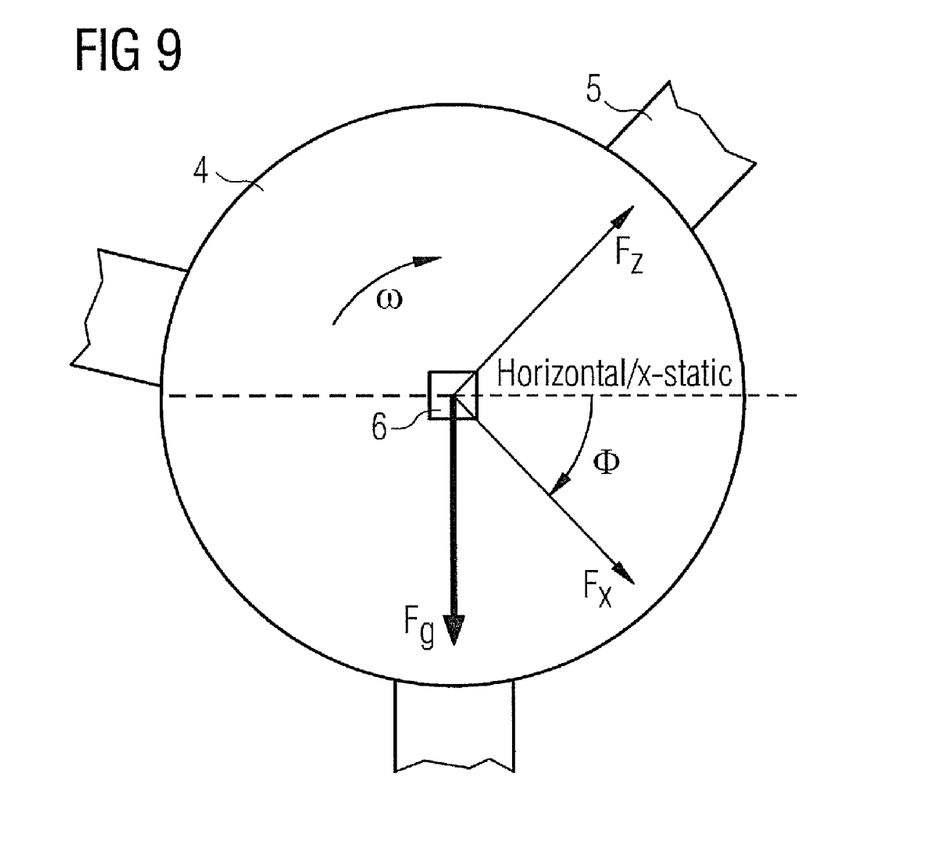
FIG. 9 shows the measured rotating forces acting on the accelerometer located in the rotating hub of a wind turbine.
Figure 10:
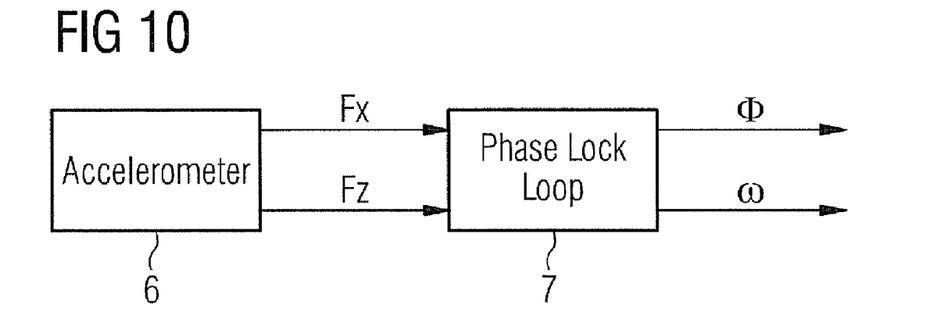
FIG. 10 shows in form of a block diagram a device for establishing the rotating azimuth angle.

Alternatively, as shown in FIGS. 9 and 10, the rotating azimuth angle Φ is found by using the measured accelerations in two perpendicular directions, $x_{rot}$-direction and $z_{rot}$-direction, where the measured accelerations represent the rotating perpendicular forces $F_x$ and $F_z$ acting on the hub and feeding these signals into a phase locked loop (PLL) unit 7 which establishes both a phase signal of the rotating hub representing the rotating azimuth angle Φ and the rotation speed/angular frequency ω of the hub 4. The rotation speed ω is useful for control of the wind turbine 1. The rotating perpendicular measured forces $F_x$ and $F_z$ acting on the hub are oscillating between a maximum value when they are pointing in the same direction as the gravitational force $F_g$ and a minimum value when they are pointing opposite the direction of the gravitational force $F_g$. Thus the accelerometer 6 measures oscillating values of $F_x$ and $F_z$ which signals are then used to find the rotating azimuth angle Φ and the rotation speed ω of the hub 4 as described above.

By the invention it is hereby possible to use only one accelerometer 6 placed in the hub 4 of a wind turbine 1 to monitor each blade frequency. As mentioned above, this is done by also using the rotating angle position (azimuth angle) Φ of the blades 5 (A, B and C), and by using the cosine values of the azimuth angle Φ multiplied with the frequencies in the x-direction monitored by the accelerometer 6 in the hub 4 (modulation). By using the cosine values of the azimuth angle Φ primarily the vibrations in the x-direction of each blade is monitored, also called edgewise vibrations. This is done with basis in the theory that the frequencies of the blade edge (in the x-direction) have the largest influence on the hub 4 with the accelerometer 6, when the blades 5 are in a vertical position and almost no influence in the horizontal position. By using the frequencies corresponding to a displacement of the blades 5 of respectively 0 degrees, 120 degrees and 240 degrees (in a typical three bladed wind turbine), and applying a Fast Fourier Transformation (FFT) to the modulated accelerometer signals, the frequencies of each blade 5 are monitored.

Alternatively the measured frequencies from the accelerometer 6 in the y-direction (along the hub 4) are used to calculate each blade frequency. It is then the flapwise vibrations of the blades 5 that are measured. Then it is not suitable to use the cosine values of the azimuth angle Φ, as the blades vibrate in the y-direction during the whole 360 degree of rotation. But as the moment load of the tower is larger in the top vertical position of the blades than in the bottom vertical position of the blades, it would be suitable to multiply the sensed frequencies with a function simulating these circumstances, like a constant number (e.g. number 1) added to the cosine value of the azimuth angle Φ and then dividing this number with 2 ((1+cos (azimuth angle Φ))/2). This function gives a number between 1 and 0 in the range of 0 and 360 degrees, and thereby extracting each blade frequency as further described above.

The controller or calculating unit which has input from the sensed signals from the accelerometer 6 and the azimuth angle Φ comprises a modulation unit which modulates the sensed signals, a Fast Fourier Transformation (FFT or DFFT) unit or a Phase Locked Loop oscillation (PLL) unit which extracts each blade frequency from the modulated signals, and further an alarm unit which sets an alarm and/or stops the wind turbine when the change of each blade frequency reaches a certain level. Alternatively also the Phase Locked Loop (PLL) unit 7 for outputting the azimuth angle Φ and an angular frequency ω on basis of the signals from the accelerometer, is an integrated part of the controller or calculating unit. All these units in the controller are not shown.

Looking only at vibrations due to the edgewise resonance frequency, the blade edgewise accelerations for each blade (A, B and C) can be described as the formula below:

$$a_A(t) = k \cdot \cos(\omega_A \cdot t)$$

$$a_B(t) = k \cdot \cos(\omega_B \cdot t)$$

$$a_C(t) = k \cdot \cos(\omega_C \cdot t)$$

Where a(t) is the blade acceleration edgewise, ω is the edgewise resonance frequency, t is the time and k is a constant.

As the accelerometer 6 is rotating with the hub 4 and the blades 5 (A, B and C) and as the accelerometer 6 is placed as shown on FIG. 3 with the $Z_{rot}$-direction of the accelerometer 6 along blade A and the $X_{rot}$-direction of the accelerometer 6 perpendicular to blade A, and the other blades placed with 120 degrees displacement around the hub, the influence in the shape of accelerations $a_x$ on the hub 4 from each blade 5 is split into a $a_{Xrot}$-component and a $a_{Zrot}$-component in the following way:

$$a_X(t,\phi) = a_{Xrot}(t) \cdot \cos(\phi) + a_{Zrot}(t) \cdot \sin(\phi)$$

Where $a_X(t,\Phi)$ is the hub acceleration in the stationary x-direction across the hub, $a_{Xrot}$ is the measured hub acceleration in the rotating $X_{rot}$-direction, $a_{Zrot}$ is the measured hub acceleration in the rotating $Z_{rot}$-direction, Φ is the rotating rotor azimuth angle and t is the time. If suitable the accelerometer 6 may be placed in another angle in relation to the blades than mentioned above and thereby turning the rotating coordinates $X_{rot}$ and $Z_{rot}$ of the accelerometer by adding this angle to the rotor azimuth angle Φ.

The edge vibrations in the blade 5 are coupled into the hub 4 with a 1 p modulation (once per revolution modulation). Assuming that the blade edge vibrations couple most with the hub 4, when the blades 5 have a vertical position (as earlier described), the hub 4 vibrations can approximately be described by:

$$a_X(t, \phi) = \left(a_A(t) \cdot \cos(\phi) + a_B(t) \cdot \cos\left(\phi - \frac{2 \cdot \pi}{3}\right) + a_C(t) \cdot \cos\left(\phi - \frac{4 \cdot \pi}{3}\right)\right) \cdot k_2$$

Where $a_X(t,\Phi)$ is the hub 4 acceleration in the stationary x-direction across the hub, $a_A$ is the blade A acceleration edgewise, $a_B$ is the blade B acceleration edgewise, $a_C$ is the blade C acceleration edgewise, Φ is the rotor azimuth angle, t is the time and $k_2$ is a constant.

Modulation of the $a_x$ signal again with respect to the individual blade position gives 3 new signals defined by:

$$am_A = a_X \cdot \cos(\phi)$$

$$am_B = a_X \cdot \cos\left(\phi - \frac{2 \cdot \pi}{3}\right)$$

$$am_C = a_X \cdot \cos\left(\phi - \frac{4 \cdot \pi}{3}\right)$$

Figure 4:
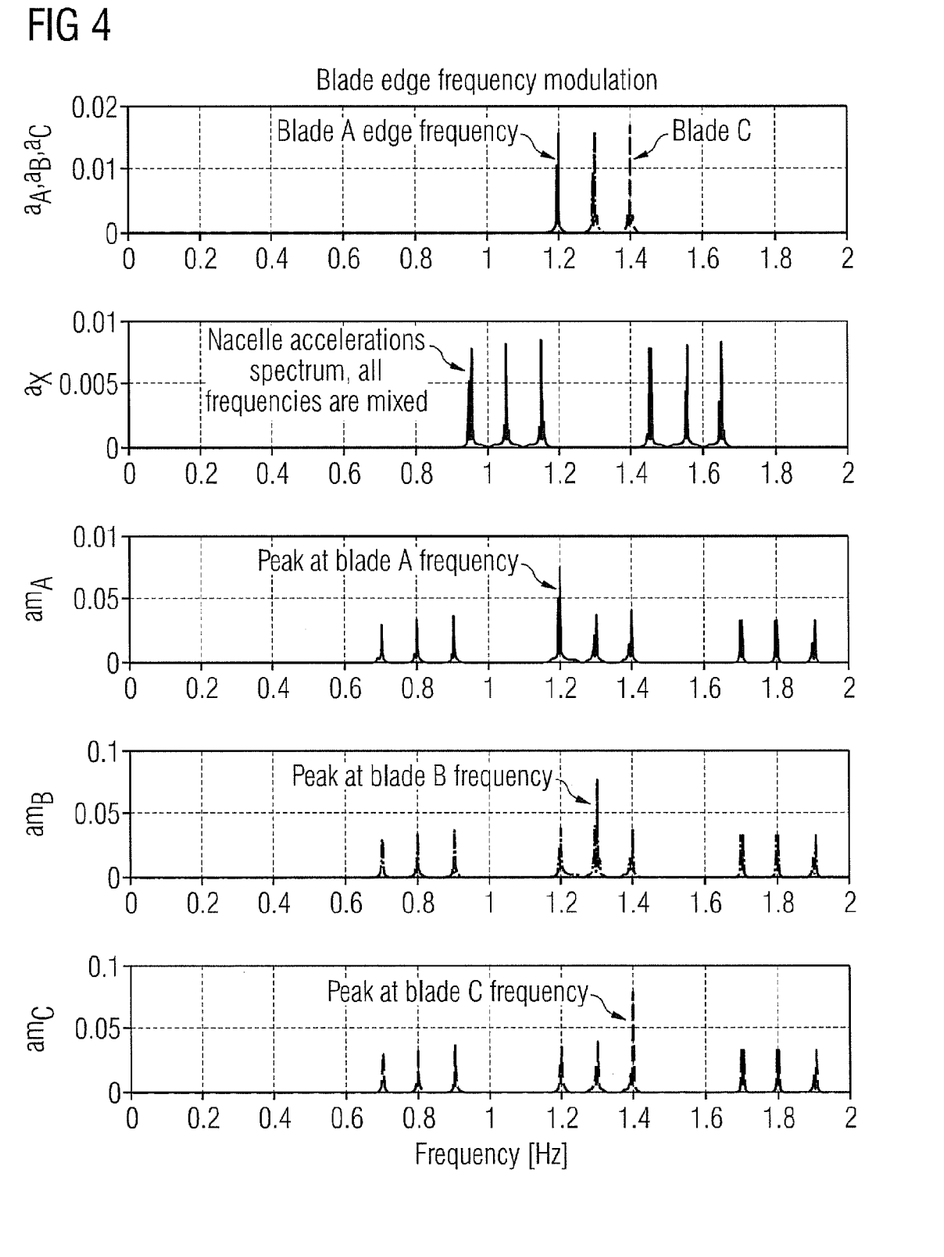
FIG. 4 shows the measured and modulated peaks of the frequency spectrum of each blade edge.

In FIG. 4, it can be seen, that the frequency spectrum for $am_A$ has its peak at the same frequency as the blade edge frequency $a_A$. It can also be seen that the blade frequency can not be separated just looking at the frequency spectrum for the nacelle acceleration ($a_X$).

Figure 5:
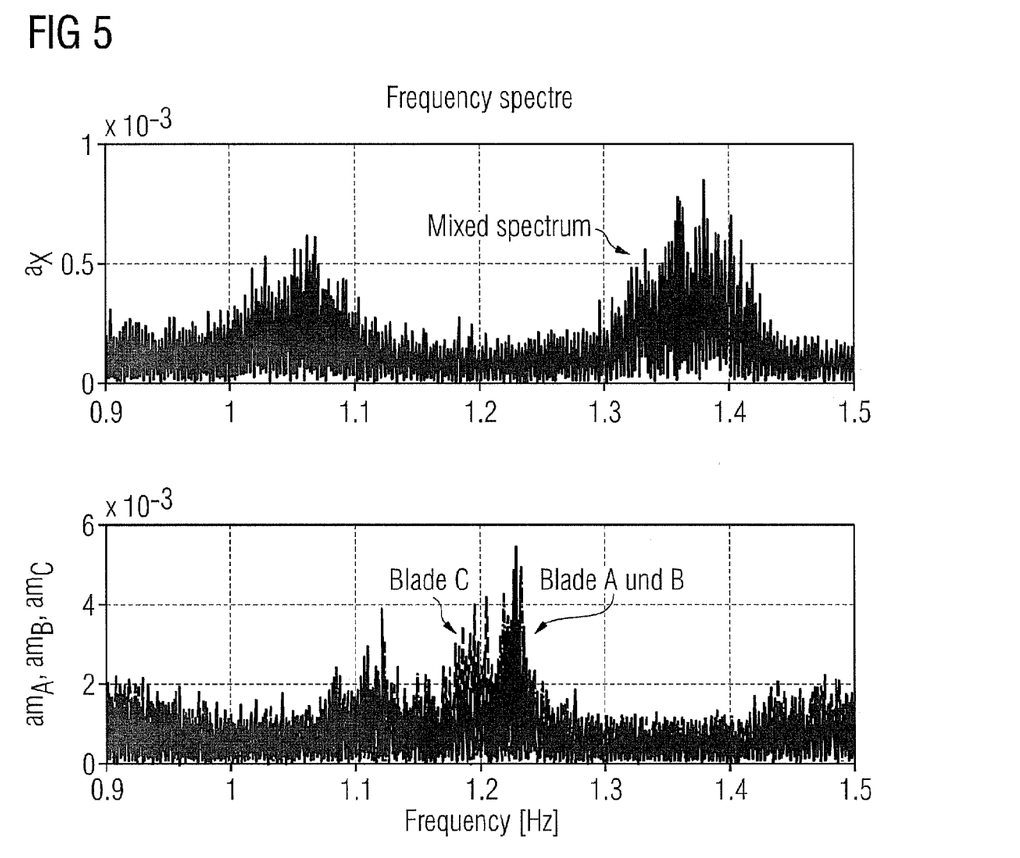
FIG. 5 shows respectively the total measured frequency spectrum and the modulated frequency spectrum of each blade.

FIG. 5 shows a plot for the frequency spectre for $a_X$ and $am_{A..C}$. The frequency peaks can be seen at 1.19 [Hz] for blade C and 1.22 [Hz] for blade A and B. The frequency peak can be founded in the frequency domain, using a Fast Fourier Transformation (FFT or DFFT). The FFT data could then be smoothed using a filter and maximum value would be the blade edge frequency. The frequency peak could also be detected in the time domain, using a Phase Locked Loop (PLL) which synchronizes an internal oscillator with the $am_{A..C}$ signal. When the PLL is synchronized, the PLL oscillator frequency will be equal to the blade frequency.

The edge frequency will be varying with changes in the temperature of the blade. There would also be some initial difference in the blade frequencies e.g. because of different mass distributions. Therefore the detection of the frequency change of one blade has to be with respect to the other blades. A method for detecting relative changes in the blade frequency is described in the formula below. The blade frequency for e.g. blade A ($f_A$) is subtracted by the mean value of the others blades ($F_B$ and $F_C$). The initial difference ($df_{A\_init}$) is subtracted to remove the initial deviation. This could be found by calculating the mean value for e.g. one day.

$$df_A = f_A - \frac{F_B + F_C}{2} - df_{A\_init}$$

$$df_B = f_B - \frac{F_A + F_C}{2} - df_{B\_init}$$

$$df_C = f_C - \frac{F_A + F_B}{2} - df_{C\_init}$$

Integrating the absolute value of the difference ($df_{A..C}$) subtracted by an allowed difference ($df_{allowed}$) gives a signal that increases fast if there is great difference and slow when having small deviations. When the DiffLev$_A$ (the same analogy for DiffLev$_B$ and DiffLev$_C$) reaches a given level an should be set and the turbine should be stopped.

DiffLev$_A$=DiffLev$_A$+|$df_A$|−$df_{allowed}$@DiffLev$_A \geq 0$

Figure 6:
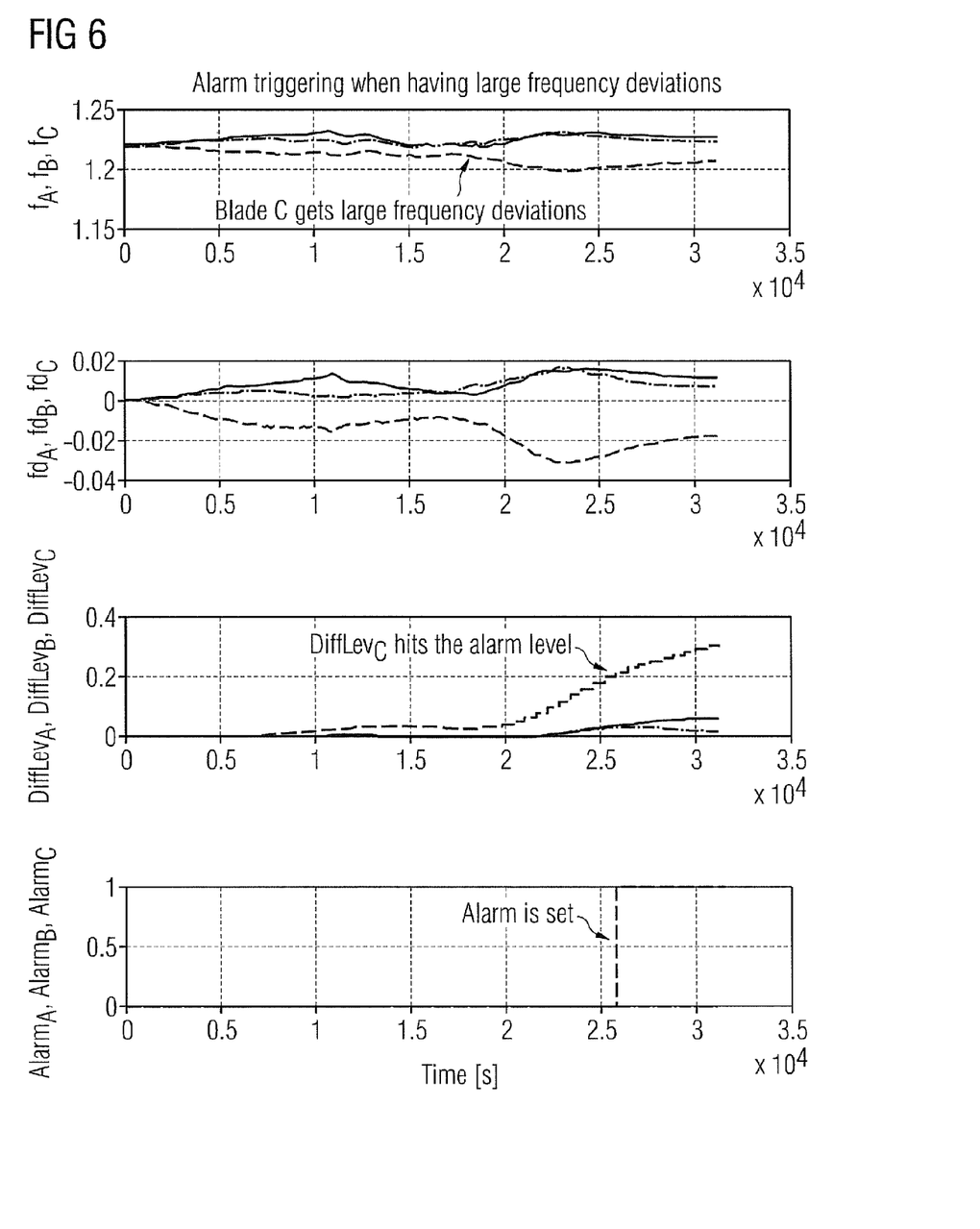
FIG. 6 shows an example of the calculated frequencies of each blade during a short period and how a change in frequency of one of the blades clearly is shown and trigging an alarm.

FIG. 6 shows an example where the blade C edge frequency is decreasing. When the allowed difference ($fd_C$) is reached, the difference level (DiffLev$_A$) begins to increase and trigs or sets the when it reaches 0.2.

The frequency difference could also be calculated by looking at the ratio between the frequencies instead of the absolute difference:

$$df_{BA} = \frac{F_B}{F_A} - df_{BA\_init}$$

$$df_{CA} = \frac{F_C}{F_A} - df_{CA\_init}$$

Frequency difference level detection:
1. If the difference is varying as a function of e.g. generator speed at normal operation without blade damage, the difference $df_{A..C}$ should be integrated with a number of integrator which should perform the integration over a given speed interval.
2. The alarm could be set when a given maximum deviation is reached, without using the integrating method.

Figure 7:
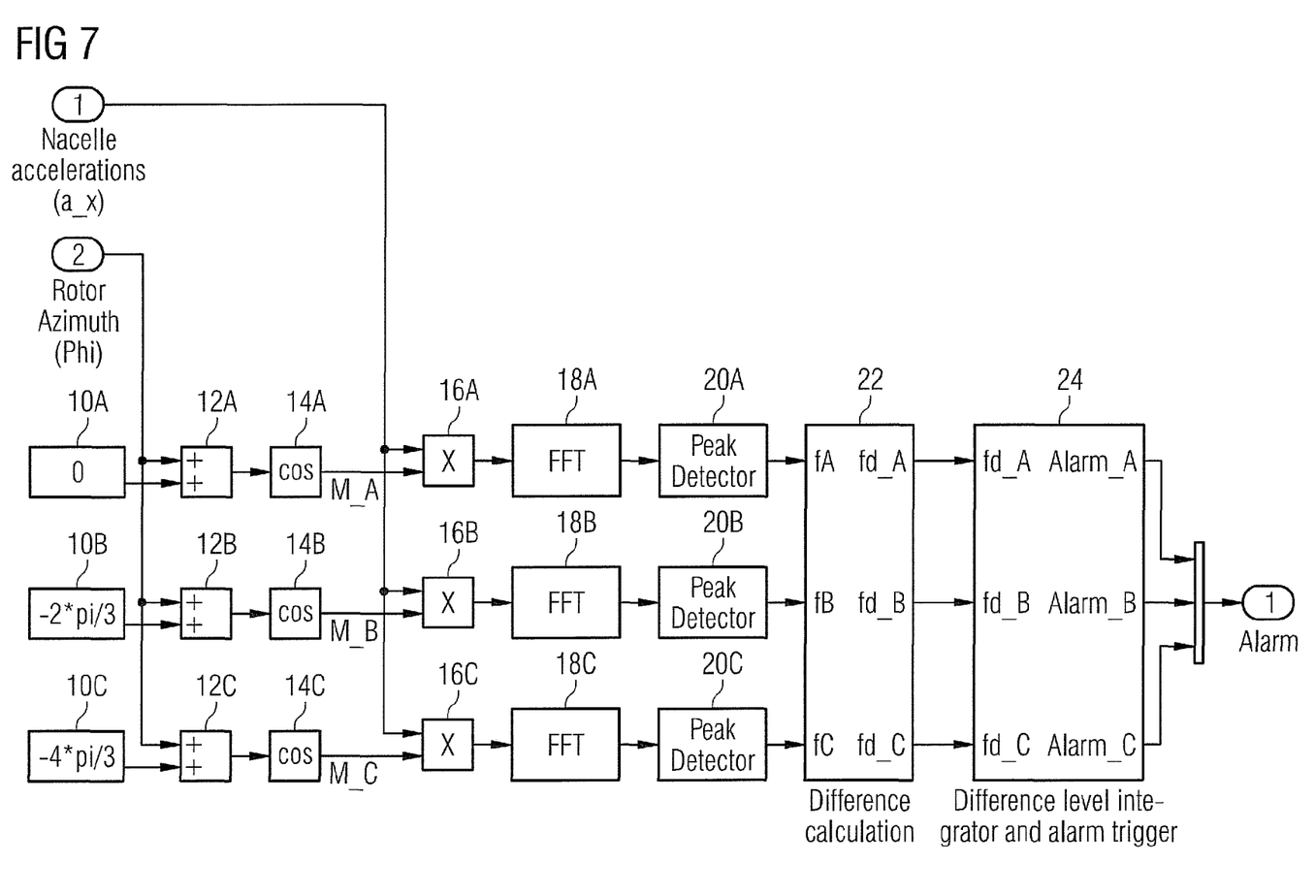
FIG. 7 shows a system for performing the method according to the invention in form of a block diagram.

An overview over a system for performing the method according to the invention is shown on FIG. 7 in form of a block diagram, where the blade frequency is found by using a FFT on the modulated acceleration signal and thereby finding the peak in the spectrum.

The system comprises for each blade a memory 10A, 10B, 10C storing a phase factor for the respective blade, an adder 12A, 12B, 12C, a cosine function unit 14A, 14B, 14C, a multiplier 16A, 16B, 16C, an FFT-unit 18A, 18B, 18C, and a peak detector 20A, 20B, 20C. A difference calculation unit 22 and a difference level integrator 24 are common for all three rotor blades.

The multipliers 12A, 12B, 12C, are each connected to the respective one of the memories 10A, 10B, 10C for receiving the phase factor stored therein. They are each further connected to the rotor azimuth detector for receiving the detected rotor azimuth angle. In the adders 12A, 12B, 12C the respective phase factor is added to received rotor azimuth angle and the result is output to the cosine function unit, which calculates the cosine of the received sum of rotor azimuth angle and phase factor. The sum is then output to the respective multiplier 16A, 16B, 16C. Each multiplier 16A, 16B, 16C further receives the signal of the accelerometer located at the hub of the wind turbine. In the multipliers 16A, 16B, 16C the received accelerations are multiplied by the respective cosine output by the cosine function units 14A, 14B, 14C. The multiplication result, which represents a modulation of the sensed signals or vibrations, is then output to the respective FFT-unit 18A, 18B, 18C, where a fast fourier transformation is performed on the modulated signals or vibrations in order to extract each blade frequency.

The result of the fast fourier transformation is then output to the respective peak detector 20A, 20B, 20C where frequency peaks of the frequency spectra output by the FFT-units are detected and then output to the difference calculation unit 22. In the difference calculation unit the difference between the respective blade frequency and the function depending on the mean values of the other blades is calculated as described above. These differences are then input to the difference level integrator and alarm trigger 24 where the integration is done as described above and an alarm is triggered when the set criteria are reached.

Figure 8:
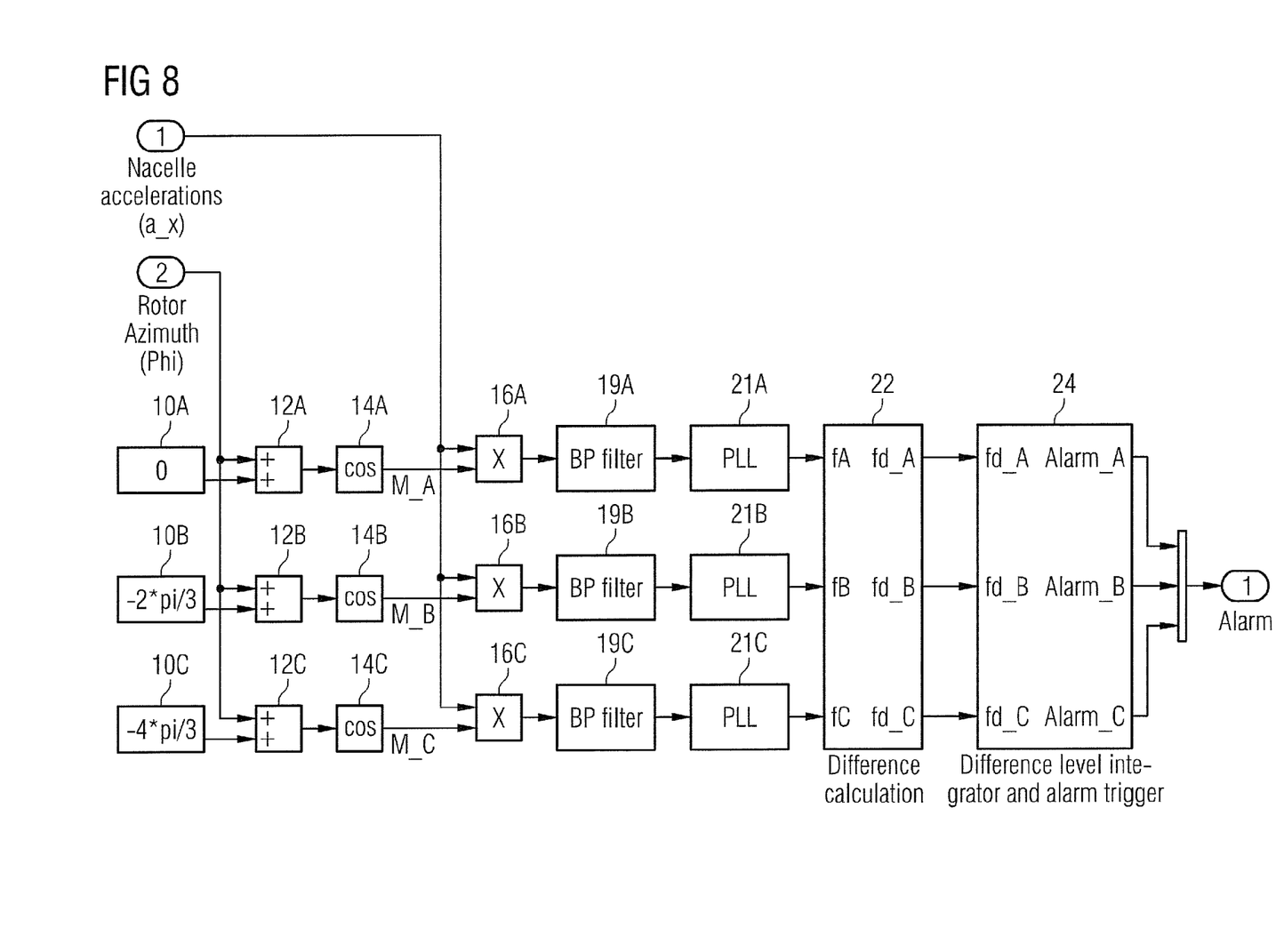
FIG. 8 shows an alternative system for performing the invention in form of a block diagram.

An alternative system for performing the method according to the invention is shown on FIG. 8, where the blade frequency is found by using a PLL (Phase Locked Loop oscillation) 21A, 21B, 21C on the modulated acceleration signal. In the present embodiment, band pass filters 19A, 19B, 19C are located between the multiplier 16A, 16B, 16C and the PLL 21A, 21B, 21C for filtering the modulated signals before inputting them into the respective PLL.

The invention claimed is:

1. A method for monitoring blade frequencies of a wind turbine comprising a tower, a nacelle, a hub and one or more rotating blades, an accelerometer attached to the hub sensing vibrations of the hub in two or more directions, the method comprising:
    modulating the sensed vibrations or signals from the accelerometer by using a rotating hub or blade angle azimuth signal, and
    extracting the blade frequencies from the modulated accelerometer vibrations or signals.

2. The method according to claim 1, wherein the extracting the blade frequencies from the modulated accelerometer vibrations or signals is done by applying a Fast Fourier Transformation or a Phase Locked Loop oscillation on the modulated accelerometer vibrations or signals.

3. The method according to claim 1, further comprising:
    sensing the rotating hub or blade angle azimuth signal by a sensor.

4. The method according to claim 1, further comprising:
    measuring the rotating hub or blade angle azimuth signal based upon variations in measuring a rotating force and a perpendicular rotating force rotating with the hub and acting on the hub in a first and a second direction due to gravitational force.

5. The method according to claim 4, wherein a signal from the accelerometer representing the rotating force of the hub is fed into a phase locked loop unit, wherein the rotating hub or blade angle azimuth signal and/or an angular frequency signal is thereby established.

6. The method according to claim 1, wherein the modulating is based upon the cosine of the rotating hub or blade angle azimuth.

7. The method according to claim 1, wherein the modulating is based upon the sum of the cosine of the hub or blade angle azimuth and a constant number.

8. The method according to claim 1, further comprising: calculating a new frequency of each blade by comparing each blade frequency to the other blade frequencies and using this comparing to calculate the change in each blade frequency.

9. The method according to claim 1, further comprising: calculating a new frequency of each blade based on the difference between each blade frequency.

10. The method according to claim 8, further comprising: setting an alarm and/or stopping the wind turbine when the new calculated frequency reaches a certain level.

11. The method according to claim 8, further comprising: stopping the wind turbine when the new calculated frequency reaches a certain level.

12. The method according to claim 9, further comprising: setting an alarm or stopping the wind turbine when the new calculated frequency reaches a certain level.

13. A monitoring system for monitoring blade frequencies of a wind turbine, comprising:
 a tower;
 a nacelle;
 a hub;
 one or more rotating blades;
 an accelerometer attached to the hub sensing vibrations of the hub in two or more directions;
 means for providing a sensed rotating hub or blade angle azimuth signal; and
 a calculating unit with input from the means for providing a sensed rotating hub or blade angle azimuth signal, wherein the calculating unit includes
  a modulation unit modulating the sensed signals by using the rotating hub or blade angle azimuth signal, and
  a Fast Fourier Transformation unit or a Phase Locked Loop oscillation unit extracting each blade frequency from the modulated signal.

14. The monitoring system according to claim 13, wherein the calculating unit is a controller.

15. The monitoring system according to claim 13, wherein the means for providing a sensed rotating hub or blade angle azimuth signal is an azimuth angle sensor.

16. The monitoring system according to claim 13, wherein the means for providing a sensed rotating hub or blade angle azimuth signal comprises a Phase Locked Loop unit.

17. The monitoring system according to claim 16, wherein the accelerometer is adapted to measure accelerations representing rotating perpendicular forces and acting on the hub, and wherein the Phase Locked Loop unit is connected to the accelerometer for receiving acceleration signals representing the rotating perpendicular forces.

18. The monitoring system according to claim 16, wherein the Phase Locked Loop unit has one or more inputs from the accelerometer and with the rotating hub or blade angle azimuth signal and/or an angular frequency signal as the output to the calculating unit.

19. The monitoring system according to claim 17, wherein the Phase Locked Loop unit has one or more inputs from the accelerometer and with the rotating hub or blade angle azimuth signal and/or an angular frequency signal as the output to the calculating unit.

20. The monitoring system according to claim 13, further comprising:
 an alarm unit in the calculating unit setting an alarm or stopping the wind turbine when a change of one or more blade frequencies reaches a certain level.

* * * * *